Dec. 22, 1964        E. LEVI        3,162,803

MAGNETIC AMPLIFIER FOR ACTIVE DIRECT CURRENT LOADS

Filed May 25, 1959

INVENTOR
ENRICO LEVI
By Ralph B. Stewart
attorney

United States Patent Office 3,162,803
Patented Dec. 22, 1964

3,162,803
MAGNETIC AMPLIFIER FOR ACTIVE DIRECT CURRENT LOADS
Enrico Levi, New York, N.Y., assignor to Polytechnic Institute of Brooklyn, Brooklyn, N.Y., a corporation of New York
Filed May 25, 1959, Ser. No. 815,343
3 Claims. (Cl. 323—89)

This invention relates to magnetic amplifiers for the control of active direct current loads of the type having a counter electro-motive-force, such as the armature of a direct current motor or an electrolytic cell and electric storage devices such as storage batteries and electric condensers.

In my new amplifier the load or gate winding of the amplifier is connected in series with a load device producing a counter-electromotive-force, the load circuit being energized from a source of pulsating unidirectional current or voltage.

The broad object of my invention is to produce a magnetic amplifier for active direct current loads which has fast response, excellent stability, smooth output, high efficiency and reliability, and low weight and cost.

A more specific object is to devise a system for energizing an active direct-current load from a source of multi-wave rectified alternating current and controlling the energization of the load device by a magnetic amplifier having its load or gate winding connected in the direct-current circuit instead of in the alternating-current circuit.

The amplifier is especially useful for controlling or varying the speed of direct-current motors.

To drive such motors, magnetic amplifiers are extensively used in the supply circuit of rectifiers and fill the gap in power range between tubes or transistors and rotating amplifiers.

Their operation, however, is seriously impaired when the load includes a source of D.-C. counter E.M.F., the result being that each core contributes to the output during a very small fraction of half a cycle. This leads to poor utilization of the expensive and heavy cores. Moreover, the high ripple content causes additional losses and when magnified by the transformers hinders the derivation of stabilizing feedback signals.

Until now the output current has been smoothed by means of chokes or by increasing the number of phases of the supply, thereby increasing the weight and time constant of the amplifier and impairing the stability of the system.

In my amplifier advantage is taken of the very fact that the counter E.M.F. limits the output period to a small fraction of half a cycle. While the existing circuits use each core only once in a period of the supply voltage, the single core of the new amplifiers repeats its cycle of operation more than once, during that time interval.

Figure 1:
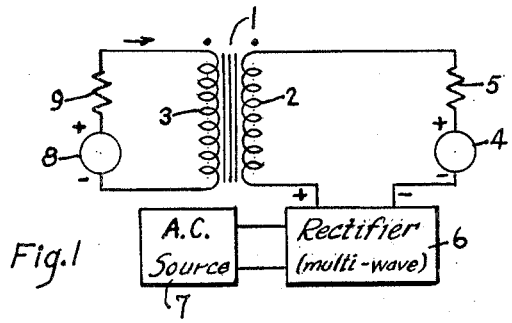
Figure 5:
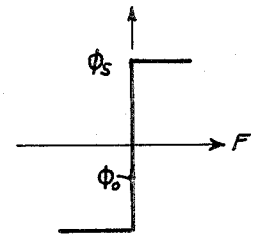
Figure 2:
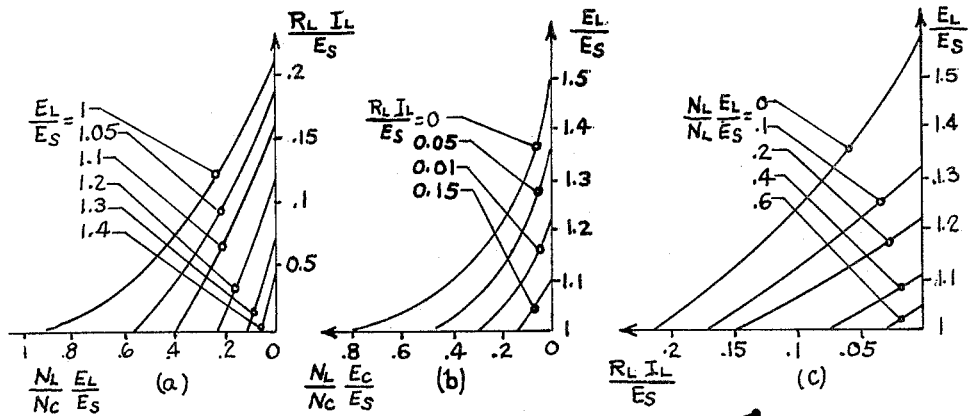
Figure 4:
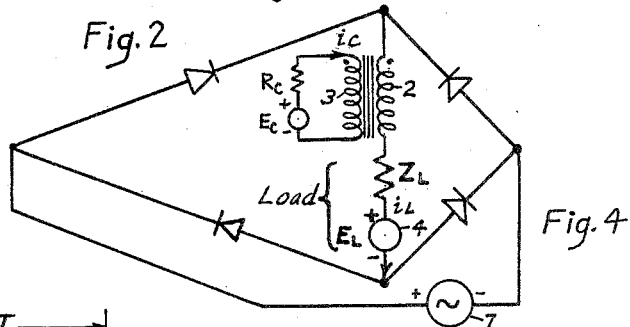
Figure 3:
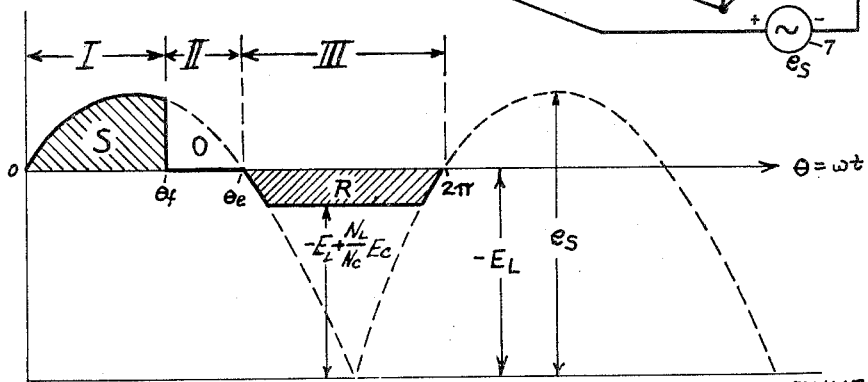

The invention will be described in connection with the accompanying drawings in which:

FIGURE 1 is a circuit diagram of a control system embodying the invention;
FIGURE 2 shows three sets of curves illustrating the operating characteristics;
FIGURE 3 shows the wave form of the voltage at the terminals of the gate or load winding;
FIGURE 4 shows the control system energized from a full-wave rectifier; and
FIGURE 5 shows the saturation curve of the magnetic core of the amplifier.

Referring to FIGURE 1, the control system includes a saturable reactor having a magnetic core 1, a gate or load winding 2 and a control winding 3. Load winding 2 is connected in series with a direct current load device represented at 4 of the type having a counter-electromotive force. The resistance 5 represents the resistance of the load circuit which is energized from a source of pulsating unidirectional voltage represented by the multi-wave rectifier 6, the rectifier being supplied with alternating current from a suitable source 7 which may be either single phase or poly-phase. The control winding 3 is energized from a suitable source of signal current or voltage represented at 8, the resistance 9 representing the resistance of the control circuit which includes conventional means for varying or adjusting the voltage or current supplied to winding 3. Winding 3 is energized in such direction that the flux change produced in core 1 is opposed to the flux change produced in the core by winding 2 when voltage or current in the load circuit is supplied from pulsating source 6. The core 1 is in the form of a simple ring type core with a single window, and preferably windings 2 and 3 are wound on the same section of the core.

The performance of the amplifier may be illustrated by the three sets of parametric curves shown in FIGURE 2 which illustrate the transfer characteristics of the amplifier for a single-phase amplifier with a resistive load. In deriving these curves the variables are the cyclic average of the load current $I_L$, the load counter E.M.F. $E_L$ and the control voltage $E_c$. These characteristics have been normalized to the average value of supply voltage $E_s$ and full load current $$\frac{E_s}{R_L}$$

in variable speed drive applications, the counter E.M.F. $E_L$ is proportional to the speed and the load current $I_L$ to the torque, therefore curves ($a$) are representative of constant speed operation, curves ($b$) of constant torque, and curves ($c$) of constant control voltage.

The operation of these amplifiers will be explained in detail only for the single-phase full-wave rectifier bridge amplifier system shown in FIG. 4 or its equivalent center tap circuit. Amplifiers with polyphase rectified supply operate according to the same principle and their performance may be illustrated by curves similar to those shown in FIG. 2.

As it appears from FIG. 4, each rectified wave of the sinusoidal voltage source $e_s$ defines a full cycle of operation of the amplifier. Considering as in FIG. 3 the voltage at the terminals of the gate or load winding, one may define three periods in an operating cycle.

Assuming an ideal core magnetization characteristic with an initial flux level $\phi_0$ as shown in FIG. 5, the core absorbs during the first or setting period (I) a positive voltage. As a consequence the flux swings upwards until saturation is reached at $\phi_s$. When the core saturates, the total voltage in the load circuit namely the algebraic sum of the rectified supply voltage $e_s$ and the load counter E.M.F. $E_L$ appears across the load impedance $Z_L$.

As saturation effectively decouples the control and load meshes, during the saturation or output period (II), the current is limited only by the load impedance. The output period (II) ends as soon as the total voltage in the load circuit becomes negative; a third or core reset period (III) follows, during which the core absorbs a negative voltage and the flux swings downwards along the magnetization characteristic, until, under steady state conditions, the initial value of flux $\phi_0$ is reached.

The amount of reset is a function of the control voltage or current, and the output of the amplifier may be varied by varying the control voltage or current.

FIG. 3 gives additional insight into the operation of the amplifier inasmuch as the volt-radian area O is proportional to the average output current and the setting area S and re-setting area R are proportional to the setting and resetting flux swings respectively. As the core reset is produced by a negative voltage it appears that the presence of a counter E.M.F. $E_L$ which shifts the voltage zero-level is essential to the operation of the amplifier. In general, referring to the polypase amplifiers, no control is possible if the counter E.M.F. $E_L$ is less than the value for which the rectified waves overlap.

Cut-off or zero output is achieved when the whole available positive volt-area is absorbed by the core. As, under steady state condition, set and reset areas are equal, the counter E.M.F. must allow for the corresponding negative area. In a single phase circuit cut-off may be reached over one third of the counter E.M.F. range, when $$E_L > E_S$$

This leaves a wide field of application for motor drives which need maximum torque when accelerating from stalling and for electrolytic processes where the counter E.M.F. of the cell never drops below a certain value.

The main feature of the new amplifiers is their fast response. With resistive load the amount of reset is a function of $E_L$ and $E_c$ only and does not depend on the output during the previous cycle, therefore the only delay present is the intrinsic half cycle time lag between reset and output. In the rectifying process, however, the supply frequency is multiplied by the number of rectified waves or phases, so that a speed of response never achieved before is obtained.

When the load circuit contains an inductance, part of the positive volt-radian area is stored as magnetic energy and is discharged into the load circuit after the total voltage has reversed its sign. As a consequence, part of the negative volt-radian area is "robbed" from the reset and added to the output period. Due to the negative sign of this area, the output current $I_L$ is decreased. At the same time the reset becomes a function of the output during the preceding period resulting in a delayed response.

It has been shown that conventional circuits, which provide for free-wheeling discharge paths, are bound to be unstable over part of the transfer characteristics, when the load contains a counter E.M.F. The new amplifiers cannot provide for discharge paths, even if a special diode is shunted across the load, because the voltage applied to the amplifier is never allowed to become negative. In consequence remarkable stability is achieved even with highly inductive loads.

Following is a brief outline for the design of the new amplifiers. Being an output stage the design is based on the load requirements; in this case, the maximum output current for a given load resistance and counter E.M.F. The output area O is thus determined. In order to bring the amplifier to cut-off the core must be able to absorb this same area, which is therefore proportional to the flux swing times the number of turns $N_L$ of the load winding. For a given material and core cross-section, the number of turns and therefore the area required in the core window by the load winding are so determined.

In determining the window area the most important term is the area occupied by the load winding, which is also representative of the weight of the amplifier.

The different amplifier types may be compared on the basis of equal load resistance $R_L$ and average load current $I_L$.

In the conventional full-wave bridge circuit each of the two cores is designed to absorb the same volt-radian area that is absorbed by the single core in the new amplifier. Each load winding carries only half of the average load current, but, on the basis of effective values, the ratio is only $$\frac{1}{\sqrt{2}}$$

so that, comparing the total weight, the new amplifier weighs 30% less than the conventional full-wave circuits. On the basis of the weight of the expensive iron, the comparison is even more favorable.

The larger cross section of the conductor in the load winding more than offsets the increase in the mean-length-of-turn, resulting in lower winding resistance and higher amplifier efficiency.

Even more favorable is the comparison with the half-wave circuit, because in addition to the smoother output and faster response allowed by the new amplifiers, their weight is about one third that of the conventional circuit.

I claim:

1. An electric control system comprising a load circuit, a source of alternating voltage, a full-wave rectifier connecting said source to said load circuit and energizing said circuit with full-wave rectified alternating voltage, means in said load circuit establishing a unidirectional voltage in opposition to said source and of a value smaller than the peak value of said source, a saturable reactor having a gate winding connected in series with said load circuit and said rectifier, a control winding on said reactor, and a source of control voltage connected to energize said control winding in a direction opposing the flux change established in said reactor by the voltage applied to said gate winding.

2. A system for controlling an active direct-current load device of the type developing a counter electro-motive-force, comprising a load circuit, a source of alternating voltage, a full-wave rectifier connecting said source to said load circuit and energizing said circuit with full-wave rectified alternating voltage having a peak value exceeding the value of said counter electro-motive-force, a saturable reactor having a gate winding connected in series with said load circuit and said rectifier, a control winding on said reactor, and a source of control voltage connected to energize said control winding in a direction opposing the flux change established in said reactor by the voltage applied to said gate winding.

3. A magnetic amplifier comprising a single high remanence saturable magnetic core, a gate circuit including a winding on said core, a source of alternating voltage, a full-wave rectifier energized by said supply and connected to said gate circuit to drive said core to saturation during each half cycle of the source, a load including means providing an electromotive force in the gate circuit in opposition to said full-wave rectified voltage, and voltage control means acting on said core for controlling the flow of current to the load during each half-cycle of the alternating voltage source.

References Cited in the file of this patent

UNITED STATES PATENTS

| | | |
|---|---|---|
| 2,423,134 | Winkler | July 1, 1947 |
| 2,675,515 | Blashfield | Apr. 13, 1954 |
| 2,783,315 | Ramey | Feb. 26, 1957 |
| 2,809,241 | Weissman | Oct. 8, 1957 |
| 2,816,260 | Scorgie | Dec. 10, 1957 |
| 2,848,668 | Ramey | Aug. 19, 1958 |
| 3,013,197 | Heightman | Dec. 12, 1961 |